(12) United States Patent
Labisch (10) Patent No.: US 11,086,277 B2
(45) Date of Patent: Aug. 10, 2021

(54) SYSTEM AND METHOD FOR DETERMINING THE PARAMETERS OF A CONTROLLER

(71) Applicant: Siemens Aktiengesellschaft, Munich (DE)

(72) Inventor: Daniel Labisch, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 69 days.

(21) Appl. No.: 16/461,618

(22) PCT Filed: Nov. 16, 2017

(86) PCT No.: PCT/EP2017/079482
§ 371 (c)(1),
(2) Date: May 16, 2019

(87) PCT Pub. No.: WO2018/091592
PCT Pub. Date: May 24, 2018

(65) Prior Publication Data
US 2020/0064787 A1 Feb. 27, 2020

(30) Foreign Application Priority Data

Nov. 17, 2016 (EP) ..................................... 16199391

(51) Int. Cl.
*G05B 13/04* (2006.01)
*G05B 6/02* (2006.01)

(52) U.S. Cl.
CPC ............. *G05B 13/042* (2013.01); *G05B 6/02* (2013.01)

(58) Field of Classification Search
CPC .................... G05B 13/042; G05B 6/02; G05B 2219/42162
See application file for complete search history.

(56) References Cited

U.S. PATENT DOCUMENTS 6,577,908 B1    6/2003   Wojsznis et al.
8,868,221 B1*  10/2014  Mealy .................... G05B 17/00
                                                       700/47
9,207,654 B2*  12/2015  Igarashi ............... G05B 13/041
(Continued)

FOREIGN PATENT DOCUMENTS

EP          0520233      12/1992
WO      WO0198845      12/2001

*Primary Examiner* — Thomas C Lee
*Assistant Examiner* — Anzuman Sharmin
(74) *Attorney, Agent, or Firm* — Cozen O'Connor (57) ABSTRACT

A system and a method for determining the parameters of a controller for a controlled system, wherein a simulation model for the controlled system is identified based on detected input and output signals of the controlled system, where parameters of a master controller and a sequence controller used in a pilot control process for the controlled system are automatically defined based on model-based design methods for a controller designed as a model sequence controller, where the behaviour of the closed-loop system can be further improved via a subsequent optimization method, such that the controller can be advantageously designed without any particular control engineering expertise, and thus the frequency of use for model sequence controllers, with their many advantages, can be significantly increased in practical applications.

13 Claims, 4 Drawing Sheets

(56) References Cited

U.S. PATENT DOCUMENTS

| | | | |
|---|---|---|---|
| 9,274,514 B2* | 3/2016 | Igarashi | G05B 17/02 |
| 10,241,490 B2* | 3/2019 | Namie | G05B 13/048 |
| 2005/0096793 A1 | 5/2005 | Takeuchi | |
| 2011/0276180 A1* | 11/2011 | Seem | G05B 13/0265 |
| | | | 700/275 |
| 2013/0035914 A1* | 2/2013 | Igarashi | G05B 13/041 |
| | | | 703/2 |
| 2017/0308056 A1* | 10/2017 | Bierweiler | G05B 23/024 |
| 2017/0324210 A1* | 11/2017 | Zhang | H01S 3/06754 |

* cited by examiner

SYSTEM AND METHOD FOR DETERMINING THE PARAMETERS OF A CONTROLLER

CROSS-REFERENCE TO RELATED APPLICATIONS

This is a U.S. national stage of application No. PCT/EP2017/079482 filed Nov. 16, 2017. Priority is claimed on EP Application No. 16199391 filed Nov. 17, 2016, the content of which is incorporated herein by reference in its entirety.

BACKGROUND OF THE INVENTION

1. Field of the Invention

The invention relates to a system and to a method for determining the parameters of a controller for a controlled system, where the system is configured to determine a simulation model for the controlled system and to identify its parameters based on detected input and output signals of the controlled system, and where parameters of the controller for a desired behavior of the control loop are defined based on a model-based design method and the previously determined simulation model.

2. Description of the Related Art

In the assessment and design of a control loop, a distinction is made between the command behavior and the disturbance behavior. The command behavior is characterized by how a controlled variable, which represents a process variable in a method or process engineering system, reacts to a change in a desired variable. Frequently, in order to assess the command behavior of a control loop, the control loop is excited by applying a desired variable with a stepped profile and the step response is evaluated. As a rule, a desired settling time is specified, after which the controlled variable should have reached a defined target corridor, and a maximum overshoot of the control variable. The disturbance behavior describes how the control variable reacts to a disturbance. If, for example, a stepped disturbance acts on the controlled system from the outside, a deviation of the control variable occurs. The controller should keep this deviation low and quickly return the control variable to the desired value.

When using conventional controllers, for example, Proportional (P), Proportional-Differential (PD), Proportional-Integrated (PI) or Proportional-Integral-Differential (PID) controllers, command and disturbance behavior cannot be specified independently of one another. This often results in a conflict of objectives, for example, when a rapid correction of disturbances is desired, but this leads to an undesirable overshoot in the command behavior. The optimization of the disturbance behavior is therefore subject to certain limits because overshoots may in principle not be too large, and it is even necessary to completely avoid them in some applications. On the other hand, an adjustment of the controller parameters of the type that an overshoot in the step response is completely avoided, can lead to a controller whose disturbance behavior is significantly worse, so disturbances are corrected only impermissibly slowly.

An additional problem occurs when in a controlled system, in other words in a process of a plant or plant section to be controlled, dead times are present. Dead times occur, for example, when an actuator with which, as an actuating element, the process is influenced, and a sensor, via which actual values of a control variable are detected on the process, are placed at a certain distance from one another. This shall be explained using an example: heating of a reactor is performed via an external continuous flow heater, from which the heated water is pumped via a pipeline into a jacket of the reactor. The actuator is the external continuous flow heater. The temperature is measured as a controlled variable in the reactor via a temperature sensor. The time that passes until the heated water arrives in the jacket represents the dead time of the controlled system.

Dead times usually have an adverse effect on the achievable control loop performance. In order to ensure stable behavior of the closed control loop even if the dead time is present, the dynamics of the loop, when a conventional controller is used, must be significantly slowed down. An attempt to accelerate the command behavior can already lead to undesirable vibrating or even unstable behavior.

One possibility for improving the control loop behavior could be seen in using a trajectory controller instead of a conventional controller, in which manipulated variable profiles that match the desired profiles of the control variable are calculated with the aid of a model of the controlled system. During operation of the control loop, a trajectory-type slave controller assumes the task of correcting deviations between trajectory and real control variable. The calculations required for this purpose can be computationally intensive. As a result, they are generally performed offline. This has the adverse effect that only previously calculated trajectories are available during operation of the control loop.

A better solution of the above-described problem is now seen in the use of a model slave control as a controller. Here, the real process is simulated as a controlled system with the aid of a model and is controlled in a pilot control process using a master controller. Disturbances and deviations cannot occur in the system simulation. Consequently, the desired command behavior can be exactly predefined by the master controller. With the aid of the pilot control process based on the system simulation, a trajectory of the control variable and a corresponding trajectory of the manipulated variable are generated online. The model slave control therefore has the advantage that no previously calculated trajectories are required compared to the above-described trajectory slave controller. With the aid of a slave controller, deviations between the online generated trajectory of the control variable and the real, actual values of the control variable that are detected at the controlled system are corrected. The sum of the manipulated variable component calculated in the pilot control process and the manipulated variable component determined by the slave controller is switched as a manipulated variable to the controlled system. By way of the design of the master controller arranged in the pilot control process, trajectories of the control variable profile and of the manipulated variable profile are defined, which are characteristic of the command behavior. Largely independent of this, the disturbance behavior can be adjusted by the slave controller. Therefore, advantageously, the command and disturbance variable behavior can be predefined largely independently of one another. Furthermore, both controllers can advantageously be designed as conventional controllers, so the controller types used are normally already known to a user from practice.

For example, it is known from EP 0 520 233 A2 how parameters of a system model can be identified and a conventional PID controller can be parameterized as a function thereof. In contrast to the conventional PID controller, with a model slave control, two controllers and one model, which interact with one another, have to be parameterized, however. The parameterization of such a structure is therefore not trivial and requires some control engineering expertise. Despite the described advantages, therefore, the structure of the model salve controller has hitherto been rarely used in technical or process engineering plants.

SUMMARY OF THE INVENTION

It is an object of the invention to provide a system and method for determining the parameters of a controller for a controlled system, by which the use of a model slave controller as a controller is facilitated, where the determination and definition of parameters of the controller is largely automated, such that the parameterization can be performed by an operator without special control engineering expertise.

This and other objects and advantages are achieved in accordance with the invention by a system for determining the parameters of a controller, a method for determining parameters, a computer program for performing the method and a corresponding computer program product, where in order to determine the parameters of a controller for a controlled system, a simulation model is initially determined for the controlled system. A "historical" data stock can be evaluated to identify a suitable model structure and the parameters thereof, which stock has been detected and stored in a plant during an earlier operation of the controlled system, or a possibility can be used to actively excite a controlled system, for example, by applying a stepped manipulated variable profile. The simulation model can be determined, for example, with the aid of the method known from the previously-cited EP 0 520 233 A2.

The identified simulation model can be used as a model of the controlled system in the pilot control process of the controller designed as a model slave control. The parameterization of the master controller in the pilot control process and the parameterization of the slave controller is model-based. Model-based design methods that differ from one another can be used in this connection. The master controller, configured as a P or PD controller, is parameterized for optimal command behavior, and the slave controller, configured as a PI or PID controller, is parameterized for good disturbance behavior. A known method can be used in each case when selecting a suitable model-based design method. For example, the master controller can be configured via the absolute value optimum and the slave controller via the symmetrical optimum, with the phase reserve being predefined at 30 degrees, for example. A model slave control that is parameterized in this way generally already exhibits significantly improved behavior compared to a single, conventional controller.

In accordance with a particularly advantageous embodiment of the invention, the master controller is arranged in the pilot control process in the feedback path of the model control loop located in the pilot control process. In practice, changes in desired value are frequently made in a stepped manner. This results in a stepped excitation of the model control loop located in the pilot control process. If this step were placed directly on a PD controller located in the forward branch, the differentiation of the step would lead to an output of the maximum manipulated variable value by the controller. If, on the other hand, the PD controller is located in the feedback path, this has the advantage that the stepped change in desired value is guided to the PD controller filtered first through the simulation model of the controlled system. In general, the arrangement of the master controller in the feedback path therefore means that the manipulated variable of the model control loop runs less frequently into its manipulated variable limitation.

The parameters of the controller previously defined based on a model-based design method can lead to control behavior, which still has an overshoot, which can be undesirable depending on the application. On the other hand, model errors that can hardly be ruled out in practice means that the command behavior deteriorates because the slave controller also influences the command behavior of the controller in this case. In accordance with a particularly advantageous embodiment of the invention, an additional optimization of the parameters of the controller can be carried out, with the two aspects of overshoot and model uncertainty being of particular importance. For the optimization, a quality criterion is selected in which preferably both the command behavior and the disturbance behavior are included. A suitable quality criterion is, for example, the sum of the quadratic control error and the squared manipulated variable at the controlled system. In addition, if necessary, a maximum value for the overshoot and a maximum value of the disturbance deflection can also be included in the quality criterion.

To calculate the quality criterion based on a simulation of the controlled process, the identified model, which is also referred to below as a nominal model, is used in the pilot control process. If the latter was also used for simulating the process, the influence of model uncertainty is completely lost. Therefore, a model family is created whose members differ in their dynamic behavior, for example, the rise time, and/or in the stationary behavior, i.e., the stationary gain, from the nominal model. Information about a suitable quantity of the deviations between the individual model variants can be obtained based on of historical data of process variables or, if a step excitation has been carried out for the process identification, from data with multiple successive step excitations. If such data is not available, then an uncertainty of the identified process model can be predefined by an operator by way of an input in an operating system, or a default value can be worked with, which is, for example, between five and ten percent. In order to calculate the quality criterion, simulation calculations are now performed in which case different members of the model family are used for simulating the controlled process. An overall quality criterion is finally determined as the sum of the quality criteria resulting from the individual simulation calculations. Various optimization algorithms are available for optimizing the quality criterion. Three methods were compared in practical testing of the controller: the active set method, the SQP method and the inferior point method. In this case, the inferior point method has been found to be best suited for the optimization because it can better interact with the secondary conditions of the optimization, which are explained in greater detail below, such as the specification of a smallest time constant of the closed control loop, the minimum damping or the phase reserve.

In practice, the problem can occur with an optimization based on the quadratic control error, that it leads to a closed control circuit with poor damping and therewith oscillating behavior. In order to avoid this, a minimum damping for the closed control loop can be specified as a secondary condition for the optimization, i.e., for the controlled system controlled by the controller. The minimum damping can be selected, for example, at d=0.3. This corresponds in the complex plane to a pole position outside a region delimited by two vectors, which each enclose an angle of 72.5 degrees with respect to the negative real axis. It should be appreciated, depending on the application, other values of the damping can also be expedient and be specified as a secondary condition.

As already described in the introduction, a dead time in the controlled system can represent a particular challenge for a controller. It is precisely in the case of a controlled system having a dead time that the model slave control can advantageously be used with automatic definition of the required parameters. In order to take into account the dead time, the nominal model of the controlled system used in the pilot control process can be broken down into a sub-model without dead time and a dead time model, which is connected downstream of the linear sub-model in a series circuit. In the model control loop of the pilot control process, the output signal of the dead time-free sub-model is then returned, while the output signal of the downstream dead time model is directed to the slave controller as a desired value specification. Optimal command behavior with optimal disturbance behavior can thus be combined with the new controller in a particularly advantageous manner even in the case of controlled systems having dead time.

In the case of controlled systems having dead time, the previously described specification of the minimum damping loses its significance by way of the definition of permissible regions of the pole position in the complex plane, which is also referred to as the S plane. The determination of the parameters of the controller, in the case of systems having dead time, is therefore advantageously supplemented by the specification of a minimum phase reserve, which can be predefined, for example, with a value of 30 degrees.

The configuration of the controller as a model slave controller leads to an additional difficulty in the implementation that must be overcome. Digital sampling controls, i.e., controls, which are implemented by a control program running on a arithmetic unit, are frequently operated at a predetermined fixed sampling time, which is geared to the dynamics of the controlled system or by the dynamics of the controlled system controlled by the controller. With the aid of a PD controller in the pilot control process, i.e., in the control loop, the dynamics of the controlled process can generally be increased significantly compared to the uncontrolled process.

The transfer function R(s) of an ideal PD controller is:

$$R(s)=K(1+T_D s), \quad \text{Eq. 1}$$

where k is the controller gain and $T_D$ is the hold-back time.

Such an ideal PD controller cannot be implemented in practice. Consequently, the transfer function thereof is supplemented by an implementation pole and therewith by an implementation time constant $T_R$. The transfer function of a real PD controller is thus:

$$R(s) = K\left(1 + \frac{T_D s}{1 + T_R s}\right). \quad \text{Eq. 2}$$

This implementation time constant $T_R$ is generally selected to be very small, for example, to one fifth of the hold-back time. In the closed control loop, the dynamics of the controlled system are usually increased by the control, such that even when a real PD controller is used, very fast dynamics and thus very small time constants of the closed control loop often result. Very fast dynamic effects due to this are hardly visible under some circumstances in a step response and are also referred to as non-dominant. However, the situation could occur in which the fastest time constant in the pilot control process is less than twice the sampling time. The Nyquist theorem would thus be infringed and the simulation of the master control loop could become numerically unstable. In principle, this behavior is also possible when using a P controller in the pilot control process. However, the use of a PD controller with a fast time constant additionally increases the probability of such behavior. It is usually not expedient to reduce the sampling time of the control further than is necessary for the actual process control. In accordance with a particularly advantageous embodiment of the invention, a lower limit of the smallest time constant of the closed control loop is thus introduced to twice the sampling time, for example, as a secondary condition of the optimization.

The determination of the parameters of a controller formed as a model slave controller can be implemented, for example, via an engineering tool of a process control system or advantageously in a software environment for cloud-based system monitoring. Such a software environment is, for example, the data-based remote service "Control Performance Analytics" belonging to Siemens AG. Data from a customer system is collected with the aid of software agents, aggregated and sent to a Siemens service operation center in which it is stored on a remote service computer. There, the data is evaluated semi-automatically with the aid of different "data analytics" software applications. If required, experts specially trained for the Remove Service can work in a highly efficient manner on this database. The results of data analysis and the optimization of the control can be displayed on a monitor of the remote service computer and/or provided on a share point so they are supplied by the end customer, in other words the operator of the automated process engineering system, for example, can be viewed in a browser. If a comparison of the newly parameterized controller with the controller already present in the plant results in advantages for the user, then they can be offered acquisition and use of the new controller.

The system and the method for determining the parameters of a controller configured as a model slave controller are therefore preferably implemented in software or in a combination of software/hardware. As such, the invention also relates to a computer program having program code instructions that can be executed by a computer for implementing the method on a suitable arithmetic unit. In this context, the invention also relates to a computer program product, in particular a data carrier or a storage medium, having a computer program which can be executed by a computer. Such a computer program can be stored, for example, in a memory of a control system of an automated process engineering plant or loaded therein, such that, during operation of the system, the method for determining the parameters and optionally the optimization thereof is performed automatically, or the computer program can be stored in a memory of a remote service computer or can be loaded into the latter in the case of a cloud-based determination of the parameters. In addition, the computer program can also be stored in a computer, connected to the control system and the remote service computer, which communicates via networks with the two other systems.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Based on the drawings, in which an exemplary embodiment of the invention is illustrated, the invention and developments and advantages will be explained in more detail below, in which.

DETAILED DESCRIPTION OF THE EXEMPLARY EMBODIMENTS

Figure 1:
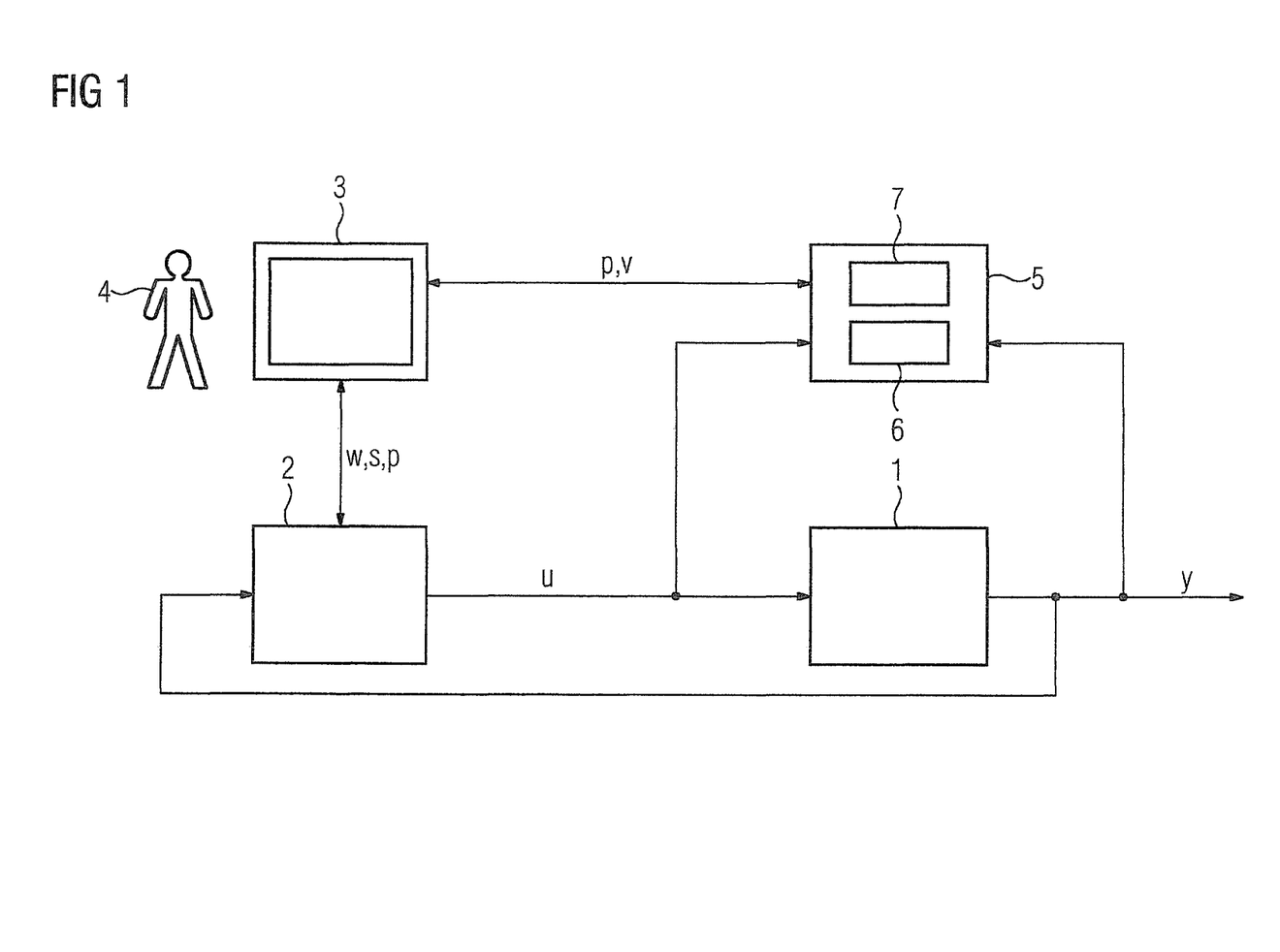
FIG. 1 shows a block diagram of a control with a system for determining parameters in accordance with the invention.

According to FIG. 1, a controlled system 1 with a controller 2 forms a part of an automated process engineering plant whose behavior is to be optimized. The controlled system 1 is, for example, a temperature control for a reactor that is filled with a process medium. The reactor is heated via a jacket that is connected to a separate water circuit for heating it. The water is heated by an electric continuous flow heater and pumped back into the jacket for heating the process medium. The process variable "temperature in the reactor" can be measured as a controlled variable y. Electric heating power supplied to the continuous flow heater is supplied as a manipulated variable u by the controller 2 for adjusting the temperature to a desired value w predefined by an operating unit 3. In addition, the control unit 3 can be used to select the structure of the controller 2 via a control signal s and to provide the defined controller type with the parameters p required in each case. This can be implemented in an automated manner or in accordance with the inputs of an operator 4. With the control signal s, a model slave controller can be particularly selected as a controller type of the controller 2 whose parameters are automatically determined by a system 5 and are offered to the operator 4 by display on the operating unit 3 for selective transfer to the controller 2. The system 5 for determining the parameters p of the controller 2 has a data memory 6 in which profiles of the manipulated variable u are stored as an input signal of the controlled system 1 and profiles of the controlled variable y are stored as an output signal of the controlled system 1. This can be historical process data, for example, which is acquired during earlier operation of the plant for the process variable "electrical heating power" or for the process variable "temperature in the reactor" and in each case is stored as temporal data sequences, which correspond to the measured values obtained in a measurement window. The data stored in the memory 6 can likewise be profiles of the input and output signals of the controlled system 2, which were obtained by active excitation of the controlled system 1, for example, a stepped excitation for better identification of a simulation model for the controlled system 1. An evaluation system 7 identifies the structure of a suitable simulation model and its parameters based on the input and output signals of the controlled system 1 stored in the data memory 6. Based on the simulation model obtained in this case and taking into account different specifications v of the operator 4, for example a specification of secondary conditions that must be taken into account in a parameter optimization, the parameters p are defined, moreover, by the evaluation system 7. The system 5 for determining the parameters of the controller 1 can be implemented, for example, by an engineering tool of a control system or by a remote service computer of cloud-based plant monitoring.

Figure 2:
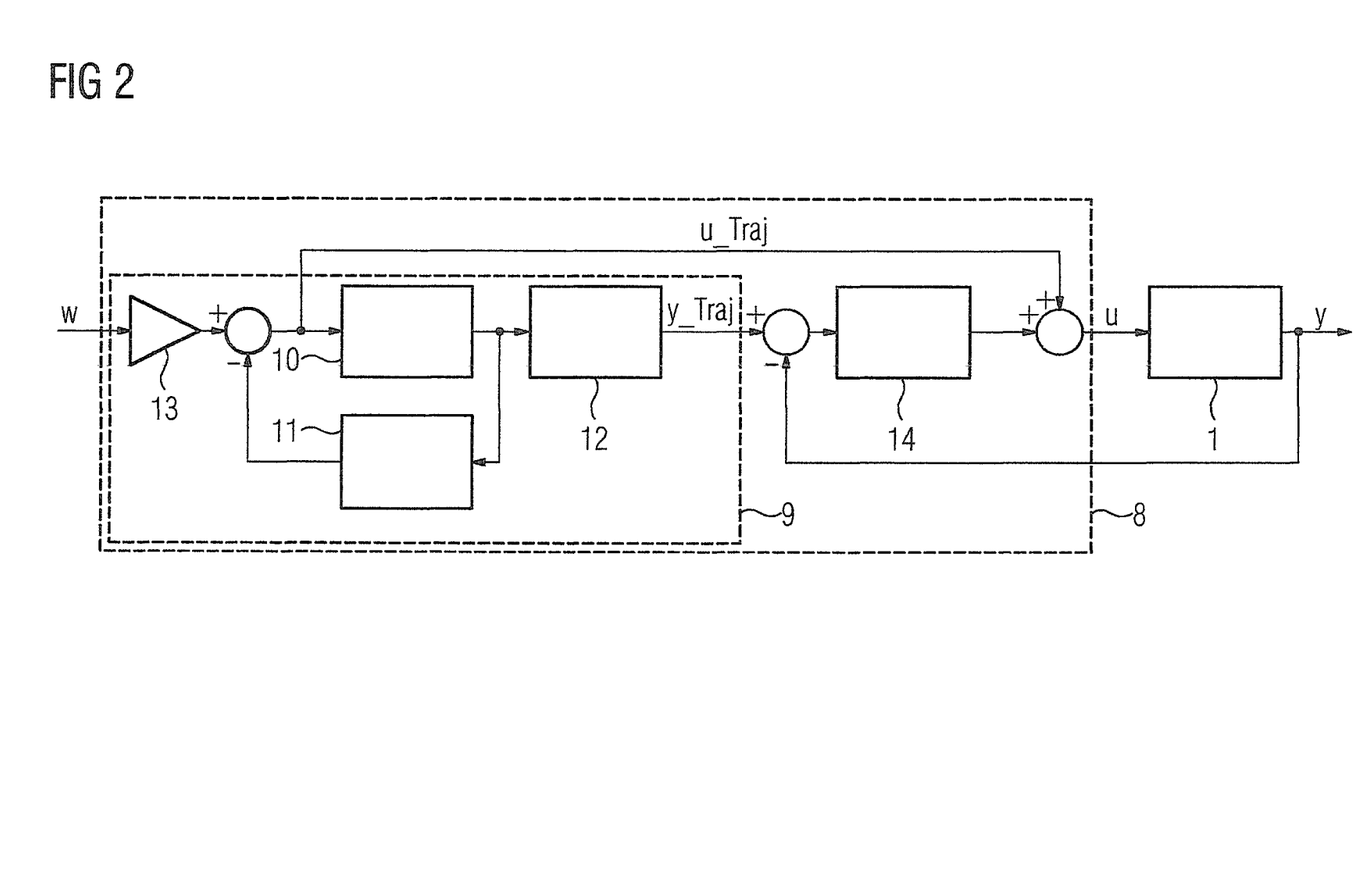
FIG. 2 shows a control circuit with a controller configured as a model slave controller in accordance with the invention.

FIG. 2 shows a structure of a controller 8, which is obtained when a model slave controller is selected as the controller type of the controller 2 (FIG. 1). Controlled system 1, manipulated variable u, control variable y and the desired value w have already been explained with reference to FIG. 1. A model control loop is formed in a pilot control process 9 of the model slave controller with a dead time-free sub-model 10 of the controlled system 1 and a master controller 11 arranged in the feedback path. A dead time model 12 connected downstream of the dead time-free sub-model 10, forms a further component of the simulation model for the controlled system 1 having dead time. In the pilot control process 9, the output signal of the dead time-free sub-model 10 is returned, such that the dead time of the controlled system 1 has no influence on the control circuit located in the pilot control process 9. A PD controller is used as the master controller 11 in the pilot control process 9 in the exemplary embodiment. The desired value w is conventionally changed in a stepped manner. Consequently, a stepped excitation of the model control loop in the pilot control process 9 often results. If the master controller 11, deviating from the illustrated exemplary embodiment, were to be arranged in the forward branch of the model control loop, the step would act directly on the PD controller and the differentiation of the step would lead to a maximum manipulated variable at the controller output. In principle, however, such an arrangement of the master controller would also be possible. In contrast, the illustrated arrangement of the master controller 11 in the feedback path has the advantage, in the event of a stepped excitation of the model control loop, that the step filtered by the dead time-free sub-model 10 acts on the master controller 11. This advantageously leads to the master controller 11 running significantly less rarely into its manipulated variable limitation.

An i component normally used in controllers has the task of ensuring the stationary accuracy of the control loop even when a constant disturbance occurs. Consequently, such disturbances are corrected and the control variable then corresponds to the predefined desired value again. Disturbances cannot occur in the model control loop. Consequently, an i component can be dispensed with in the master controller 11. Improved dynamics can be advantageously achieved in the closed model control loop with a master controller 11 without an i component. In the case of complete omission of the i component, the model control loop would generally not be exactly stationary and a stationary gain of the model control loop deviating from one would result. In order to compensate for this effect, a p-element, i.e., a multiplication element, with the reciprocal of the stationary gain of the model control loop as a factor is connected upstream of the model control loop as a pre-filter 13. This measure could be omitted if the model control loop has the stationary gain 1 or if the master controller, as already described above, were to alternatively be arranged in the forward branch instead of in the feedback path.

The controlled system 1 is a system having a dead time. As a result, the simulation model of the controlled system 1 identified by means of the system 5 (FIG. 1) is separated into the dead time-free sub-model 10 and the dead time model 12. A first parameterization of the master controller 11 is performed in accordance with the absolute value optimum as a first model-based design method. The PI or PID controller configuration, which is connected downstream of the pilot control process 9 in the controller 8 as a slave controller 14, is implemented with the symmetrical optimum as a second model-based design method. A phase reserve of, for example, 30 degrees is specified for a desired stability of the control loop. In the simulation, which is performed in the pilot control process 9, no disturbances and deviations can occur. Consequently, the desired command behavior can be exactly predefined by the master controller 11. A first trajectory y_Traj is generated as a desired value specification for the slave controller 14 and a second trajectory u_Traj, which is added-on downstream of the slave controller 14 in the manner of a disturbance variable add-on, is generated from the simulation online, i.e., during the course of the control. Therefore, the sum of the trajectory u_Traj of the manipulated variable generated in the model control loop and the manipulated variable generated by the slave controller 14 is added-on as manipulated variable u to the controlled system 1. The command behavior is specified by the design of the trajectories y_Traj and u_Traj. Practically independently thereof, the disturbance behavior can be advantageously adjusted by the slave controller 14.

Deviating from the previously described absolute value optimum and the symmetrical optimum, it is of course alternatively possible to use other known model-based design methods for parameterizing the master controller 11 or the slave controller 14.

This first parameterization of the controller 8 made on the basis of one or more model-based design method(s) already exhibits much better behavior than a controller in which only one conventional controller is used. Additional measures are used to further improve the control behavior. If data relating to a plurality of step responses of the controlled system is present in the data memory 6 (FIG. 1), then this is compared to identify the process. In general, it can be assumed that the exact same behavior of the controlled system does not always appear. A model is identified as a simulation model of the controlled system 1, which leads to the best possible mapping of all step responses and is referred to in the present application as a nominal model. In the case of a controlled system having dead time, this nominal model is divided into the dead time-free sub-model 10 and the dead time model 12. Otherwise, the dead time model is omitted. The complete model slave control loop is simulated for further optimization, with the nominal model, slightly modified, being used as a model of the controlled system 2. In other words, the real controlled system 1 in the model slave control loop is replaced by a model in each of these simulations. Members of a model family that are obtained by permutations of the nominal model are used for the different simulation runs. The model family contains members whose transmission functions as far as possible map the variance in the identification data stored in the data memory 6 (FIG. 1). In order to define a suitable imaging region, the fastest possible and the slowest time constants and the largest and smallest possible stationary gain are determined using the identification data. These variations are permuted relative to one another in accordance with Table 1, so four elements are obtained, see rows number 2 to 5, as members of the model family.

TABLE I

| No. | System gain | $1^{st}$ time constant | $2^{nd}$ time constant | $3^{rd}$ time constant |
|---|---|---|---|---|
| 1 | No change | No change | No change | No change |
| 2 | No change | Increase | Increase | Increase |
| 3 | No change | Decrease | Decrease | Decrease |
| 4 | Increase | Decrease | Decrease | Decrease |
| 5 | Decrease | Increase | Increase | Increase |
| 6 | Fast $PT_1$ element in series | | | |

In addition, the unchanged nominal model according to row number 1 of Table I is used as a first family member. The model listed in row number 6 as the last member of the model family corresponds to a nominal model, which is supplemented by a PT1 element connected in series thereto, the time constant of which is smaller by a factor of 5 than the dominant time constant of the nominal model. Such fast dynamics can hardly be recognized in the step responses of the controlled system 2 and are therefore mostly not identified in the step of process identification, but have an influence on the behavior of the closed control loop. This fact is taken into account with the last member of the model family, which is listed in row number 6 of the table.

As an example of the procedure, a PT3 nominal value shall be considered with the transfer function $$G(s) = \frac{K}{(T1s+1) \cdot (T2s+1) \cdot (T3s+1)}. \qquad \text{Eq. 3}$$

This nominal model leads to the model family listed in Table I.

If there are only a few step responses for identifying the parameters of a simulation model for the controlled system 1, then the variation is generated heuristically, because the changes in the time constants and the gain are predefined, for example, to 5%.

In order to optimize the controller 8, a value of a quality criterion is calculated for each simulation run, with the value being calculated as the sum of the quadratic control error and the quadratic manipulated variable. As a result, so both the command behavior and the disturbance behavior are included in the quality criterion. In addition, the maximum overshoot and the maximum disturbance deflection are taken into account. An overall quality criterion is finally determined as the sum of the values of the quality criteria obtained for the individual simulation runs. The optimization is performed via the inferior point algorithm. A minimum damping for the control loop is specified as a secondary condition for the optimization. The controlled system 1 has a dead time. Accordingly, this is advantageously achieved by specifying a minimum value of 30 degrees for the phase reserve of the closed control loop.

Figure 3:
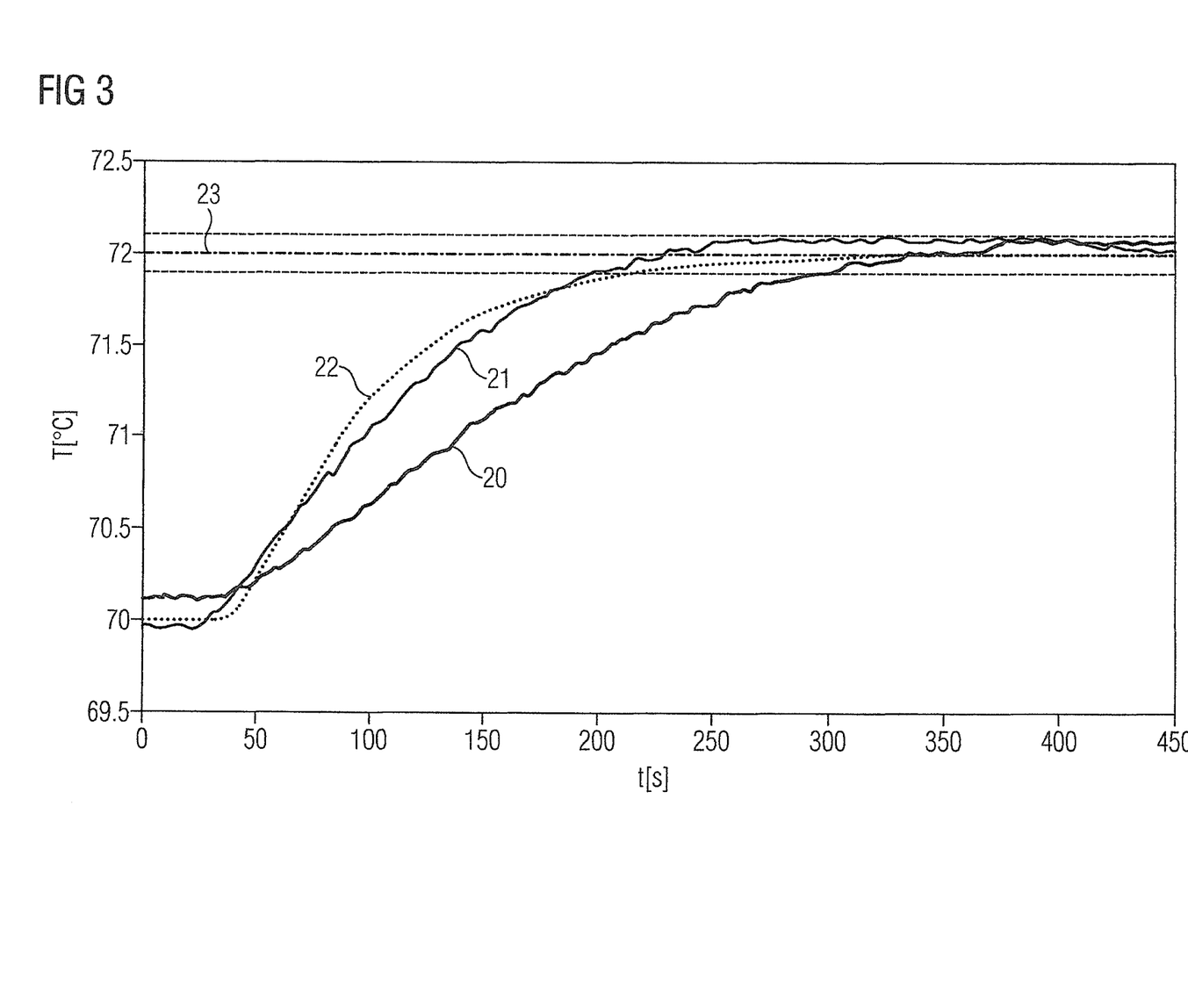
FIG. 3 shows graphical plots of time profiles of controlled variables when using different types of controller in accordance with the invention.

In order to illustrate the advantages of the controller obtained therewith, the graphical plot of the time graph of FIG. 3 shows a profile 20 of a controlled variable, which has been obtained in the controller when a PI controller is used as a conventional controller, a profile 21 of a control variable when an automatically parameterized model slave control is used, a profile 22 of a trajectory y_Traj calculated in the pilot control process and a profile 23 of the desired value. The time t in the unit s (seconds) is plotted on the abscissa, where the temperature t in the unit ° C. is plotted on the ordinate. The illustrated profiles 20, 21, 22, 23 were obtained as a controlled system with the temperature control system of a reactor already described above. With a plurality of step excitations, the dynamic behavior of the reactor was identified and a model family generated from the inaccuracies. Using these, the model slave control was automatically parameterized in accordance with the method described above. A stepped change in the temperature desired value from 70° C. to 72° C. at the time t=0 s was evaluated. After a dead time of approximately 30 s, all the profiles 20, 21 and 22 of the temperature rise as a control variable. The time until the new desired temperature of 72° C. is reached to an accuracy of 0.1 K is approximately 300 s in the case of the conventional PI controller having the profile 20. By contrast, the model slave control adjusts to the new desired value considerably more quickly and reaches the tolerance band as early as after about 198 s. Advantageously, no special expertise is required for the parameterization of the controller configured as a model slave controller. As a result, the parameterization can be performed by any user. The clearly visible deviations between the profile 21 of the real control variable y and the profile 22 of the trajectory y_Traj calculated, based on the simulation model show that there are noticeable deviations between the nominal model and the real controlled system. However, these are taken into account with the aid of the optimization using a model family and therefore have little adverse effect on the behavior of the closed control loop.

It is already clear from the described exemplary application that the automatic parameterization of a model slave controller can be used particularly advantageously with processes that have low dynamics and whose command behavior is to be significantly accelerated, with processes in which a fast disturbance correction in connection with an overshoot-free and not excessively slow command behavior is desired, and with processes having dead time since no dead time acts in the control loop of the pilot control process and therefore the command behavior can be significantly improved.

A PD controller is used in the pilot control process of the exemplary embodiment. As a result, the command behavior can be improved considerably compared to a conventional PI controller and also significantly compared to a conventional PID controller as a controller.

Figure 4:
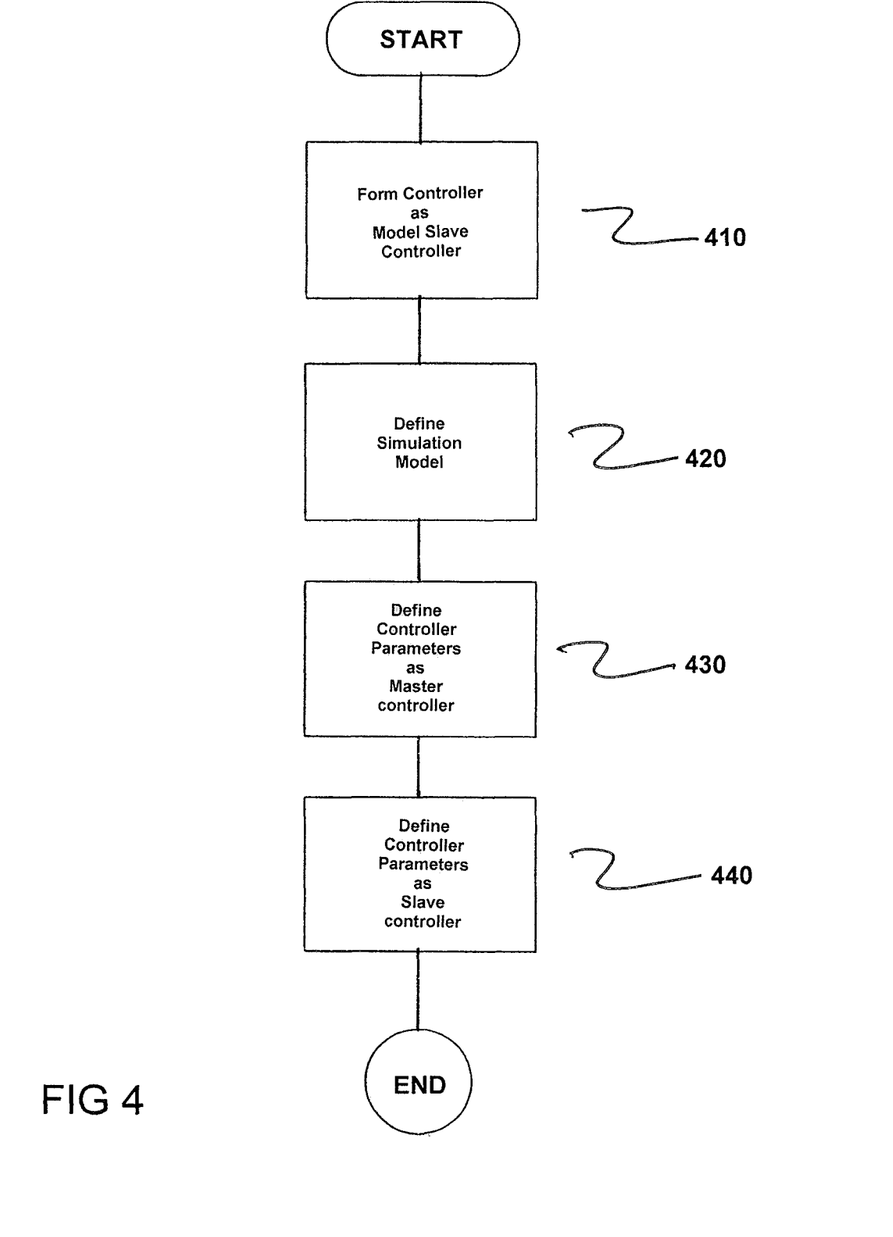
FIG. 4 is a flowchart of the method in accordance with the invention.

FIG. 4 is a flowchart of a method for determining parameters of a controller 8 for a controlled system 1, where a simulation model 10, 12 is determined for the controlled system 1 and the parameters of the controller 2, 8 for the controlled system 1 are identified based on detected input and output signals u; y of the controlled system 1. The method comprises forming the controller 8 as a model slave controller having (i) a slave controller 14 for the controlled system 1 and (ii) a pilot control process 9 having a master controller 11 and a simulation model 10, 12 for the controlled system 1, as indicated in step 410

Next, the simulation model 10, 12 is defined in the pilot control process 9 based on the determined simulation model 10, 12 and identified parameters of the controlled system 1, as indicated in step 420.

Next, parameters of a Proportional P or Proportional-Differential PD controller are defined as a master controller II in the pilot control process 9 based on a first model-based design method and the determined simulation model 10, 11, as indicated in step 430.

Parameters of a Proportional-Integrated (PI) or proportional-integral-derivative (PID) controller are now defined as a slave controller 14 for the controlled system 1 based on a second model-based design method and the determined simulation model 10, 12, as indicated in step 440.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A system for determining parameters of a controller for a controlled system, comprising:
an evaluator; and
data memory;
wherein the system includes a computer executing a control program and is configured to determine, based on detected input and output signals of the controlled system, a simulation model for the controlled system and to identify the parameters of the controller for the controlled system;
wherein the controller comprises a model slave controller having a pilot control process and slave controller;
wherein the slave controller for the controlled system is arranged downstream of the pilot control process for the controlled system and the pilot control process includes a master controller which is arranged in a feedback loop of a model control loop within the pilot control process, the pilot control process including a simulation model for the controlled system; and
wherein the system including the computer executing the control program for determining the parameters is further configured to:
define the simulation model in the pilot control process based on the previously determined simulation model and the identified parameters of the controller for the controlled system, based on a first model-based design method and the previously determined simulation model parameter of a proportional or proportional-differential controller as a master controller in the pilot control process, and based on a second model-based design method and the previously determined simulation model parameters of the proportional or proportional-integral-derivative controller as the slave controller for the controlled system arranged downstream of the pilot control process of the controlled system.

2. The system as claimed in claim 1,
wherein a desired value is guided to a subtracting element via a multiplication element as a pre-filter to form a difference from a desired value scaled via the pre-filter and the output signal of the master controller;
wherein the formed difference is guided to the simulation model in the pilot control process; and
wherein the system for determining the parameters is further configured to define the multiplication factor of the pre-filter for optimal command behavior of the controller based on the first model-based design method and the simulation model.

3. The system as claimed in claim 1, wherein the system for determining the parameters is further configured to (i) generate a model family whose members differ in at least one parameter based on the determined simulation model and identified parameters, (ii) calculate a value of a quality criterion in each case, and a sum of the values of the quality criterion as the overall quality criterion based on simulations in which different members of the model family are used instead of the controlled system, and (iii) perform an optimization of the overall quality criterion to determine optimized parameters of the controllers.

4. The system as claimed in claim 2, wherein the system for determining the parameters is further configured to (i) generate a model family whose members differ in at least one parameter based on the determined simulation model and identified parameters, (ii) calculate a value of a quality criterion in each case, and a sum of the values of the quality criterion as the overall quality criterion based on simulations in which different members of the model family are used instead of the controlled system, and (iii) perform an optimization of the overall quality criterion to determine optimized parameters of the controllers.

5. The system as claimed in claim 3, wherein the system for determining the parameters is further configured to take into account a predefined or predefinable minimum damping for the controlled system controlled by the controller as a secondary condition during the optimization of the overall quality criterion.

6. The system as claimed in claim 1, wherein in an event of the controlled system having dead time, the simulation model consists of a series circuit comprising a linear sub-model and a dead time model connected downstream thereof; and wherein the output signal of the linear sub-model is returned in the model control loop of the pilot control process.

7. The system as claimed in claim 2, wherein in an event of the controlled system having dead time, the simulation model consists of a series circuit comprising a linear sub-model and a dead time model connected downstream thereof; and wherein the output signal of the linear sub-model is returned in the model control loop of the pilot control process.

8. The system as claimed in claim 3, wherein in an event of the controlled system having dead time, the simulation model consists of a series circuit comprising a linear sub-model and a dead time model connected downstream thereof; and wherein the output signal of the linear sub-model is returned in the model control loop of the pilot control process.

9. The system as claimed in claim 6, wherein the system for determining the parameters is further configured to take into account a predefined or predefinable minimum phase reserve for the controlled system controlled by the controller as a secondary condition during the optimization of the overall quality criterion.

10. The system as claimed in claim 1, wherein the system for determining the parameters is further configured to take into account a lower limitation of the time constants of the controlled system controlled by the controller to twice a sampling time as a secondary condition during the optimization of the overall quality criterion.

11. A method for determining parameters of a controller for a controlled system including a computer executing a control program, a simulation model being previously determined for the controlled system and the parameters of the controller for the controlled system being identified based on detected input and output signals of the controlled system, the method comprising:

forming the controller as a model slave controller having a pilot control process and a slave controller, the slave controller for the controlled system being arranged downstream of the pilot control process for the controlled system including the computer executing the control program, the pilot control process including a master controller which is arranged in a feedback loop of a model control loop within the pilot control process and including the previously determined simulation model for the controlled system;

defining a simulation model in the pilot control process based on the previously determined simulation model and identified parameters of the controller for the controlled system;

defining parameters of a Proportional or Proportional-Differential controller as a master controller in the pilot control process based on a first model-based design method and the previously determined simulation model; and defining parameters of a Proportional-Integrated or proportional-integral-derivative controller as a slave controller for the controlled system arranged downstream of the pilot control process of the controlled system based on a second model-based design method and the previously determined simulation model.

12. A non-transitory computer-readable medium encoded with a computer program which, when executed by a computer, causes determination of parameters of a controller for a controlled system, a simulation model being previously determined for the controlled system and the parameters of the controller for the controlled system being identified based on detected input and output signals of the controlled system, said execution comprising:

forming the controller as a model slave controller having a pilot control process and a slave controller, the slave controller for the controlled system being arranged downstream of the pilot control process for the controlled system including the computer executing the control program, the pilot control process including a master controller which is arranged in a feedback loop of a model control loop within the pilot control process and including the previously determined simulation model for the controlled system;

defining the simulation model in the pilot control process based on the previously determined simulation model and identified parameters of the controller for the controlled system;

defining parameters of a Proportional or Proportional-Differential controller as a master controller in the pilot control process based on a first model-based design method and the previously determined simulation model;

defining parameters of a Proportional-Integrated or proportional-integral-derivative controller as a slave controller for the controlled system arranged downstream of the pilot control process of the controlled system based on a second model-based design method and the previously determined simulation model.

13. The non-transitory computer program product of claim 12, wherein the non-transitory computer program product comprises a data carrier or storage medium.

* * * * *